United States Patent [19]

Avrich et al.

[11] 4,208,893
[45] Jun. 24, 1980

[54] ANTI-TAMPERING DEVICE FOR VALVE STEMS

[76] Inventors: Joseph Avrich, 285 NE. 191 St., #2924, North Miami Beach, Fla. 33179; Arthur C. Ripley, Rte. #1, Box #5, Astor, Fla. 32002; Robert Ould, 16980 NE. 1 Ave., North Miami Beach, Fla. 33162

[21] Appl. No.: 900,093

[22] Filed: Apr. 26, 1978

[51] Int. Cl.² ............................................ F16K 35/00
[52] U.S. Cl. ......................................... 70/178; 70/179; 70/180
[58] Field of Search ................. 70/178, 179, 180, 177, 70/167, 164, 170, 171, 175

[56] References Cited

U.S. PATENT DOCUMENTS

| | | | |
|---|---|---|---|
| 595,886 | 12/1897 | Mullen | 70/178 |
| 748,720 | 1/1904 | Glazier | 70/178 |
| 1,484,793 | 2/1924 | Moore | 70/178 |
| 1,530,814 | 3/1925 | Credle | 70/178 |
| 1,541,801 | 6/1925 | Durning | 70/180 |
| 1,920,128 | 7/1933 | Mickler | 70/178 |
| 2,377,036 | 5/1945 | Quarfoot | 70/178 |

*Primary Examiner*—Roy D. Frazier
*Assistant Examiner*—Carl F. Pietruszka

[57] ABSTRACT

An anti-tampering device for protectively housing a valve stem operator, wherein the valve stem operator is connected to a pipe. The device includes a skirted keeper body having a main aperture and a pair of spaced hooked legs for hooked up engagement with the pipe on either side of the valve stem and in depending relation to the body. The skirted keeper body further includes an upstanding member having a first padlock aperture and means for connecting the legs to the body. The device includes a cap having a first padlock end with a second padlock aperture such that when the cap is in overlaying relation to the main aperture, the padlock apertures of the cap and body are in alignment.

7 Claims, 5 Drawing Figures

ANTI-TAMPERING DEVICE FOR VALVE STEMS

FIELD OF THE INVENTION

This invention relates to a device for locking a valve in a pipe.

BACKGROUND OF THE INVENTION

As is perhaps well known, many public utility companies deliver water to homes from a common line through a feeder line to the home. Generally, there is a valve in the feeder line adjacent the common line which controls flow to and from the home. If a person does not pay his bill, the valve is shut off. Many home owners or, indeed, business owners, promptly send one of their people out who turns the valve back on and, notwithstanding the lack of payment on the bill, water flows in the home or business. This invention is of a lock to protectively cover the valve so that it cannot be turned on and it includes a device which hooks to the pipe and guards against turning of the valve stem and a protective hood which is locked in position.

It is, accordingly, an object of this invention to provide a device which guards against unwarranted access to a valve controlling flow in a pipe and which is simple and inexpensive to install, very effective in maintaining a valve in a locked condition, and is, generally speaking, well adapted for the purposes for which it is intended.

In accordance with these and other objects which will become apparent hereinafter, the instant invention will now be described with reference to the accompanying drawings, in which:

DESCRIPTION OF THE PREFERRED EMBODIMENT

Figure 1:
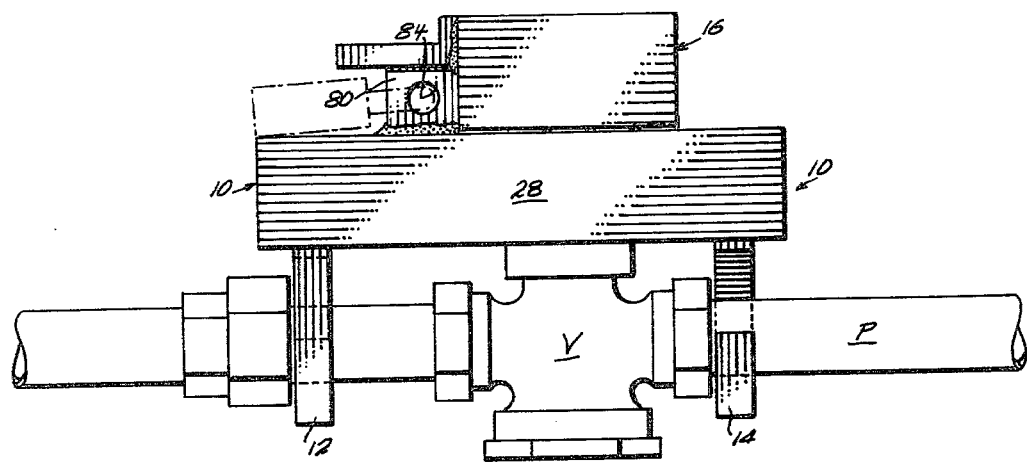
FIG. 1 is a side elevation view of the instant invention applied to a pipe in covering relation of a valve.
Figure 2:
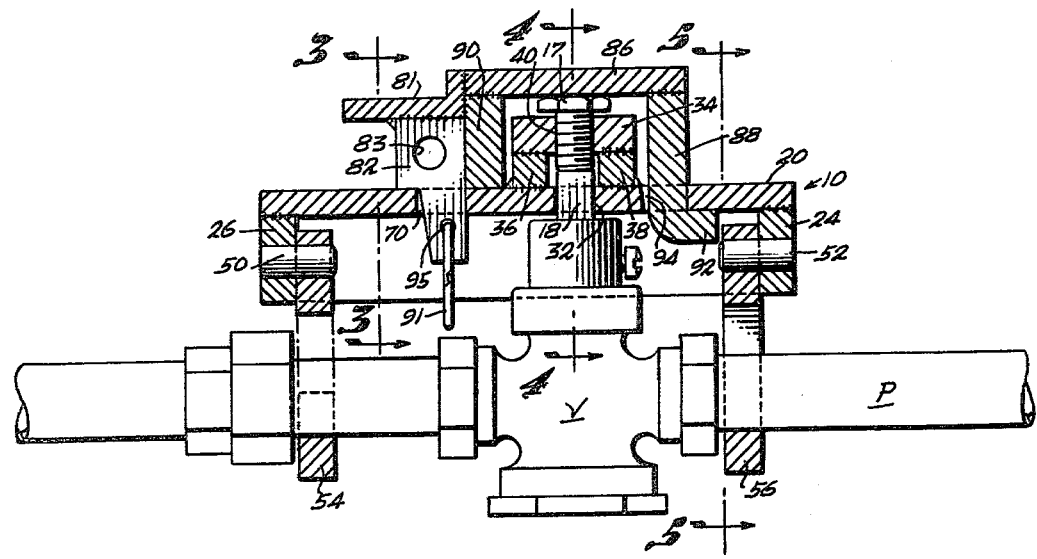
FIG. 2 is a view in cross section of FIG. 1.
Figure 4:
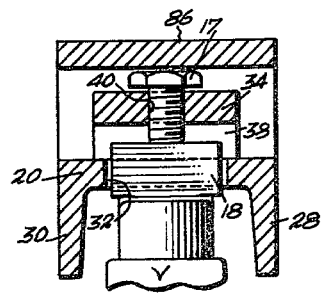
FIG. 4 is a partial view in cross section taken on the plane indicated by the line 4—4 of FIG. 2 and looking in the direction of the arrows.

Referring to the drawings wherein like reference characters designate like or corresponding parts throughout the several views, there is shown a valve which is designated by the numeral V; and it is installed on a pipe P. The valve is normally locked, after it has been closed. The device generally designated by the numeral 10 is the locking means effective for locking the valve so that it cannot be manipulated. The device includes a keeper 20 from which two hooked legs 12 and 14 depend in spaced relation, one hooked leg engaging the pipe on one side of the valve V and the other hooked leg engaging the pipe on the other side of the valve V. A cap 16 is provided in covering relation of a hole 32 through which the valve stem 18 extends. The hole is sized and shaped, as seen in plan, and as can be seen on reference to FIGS. 2 and 4, so that the stem, which is also elliptical as seen in plan, cannot be turned while it extends into the hole. The cap 16 or hood is removable and is normally locked in position as shown in FIG. 1 to guard against any rotational movement of the stem of the valve to open it. The manner of installing the lock will be apparent in the light of the following disclosure on reference to the drawings.

Figure 5:
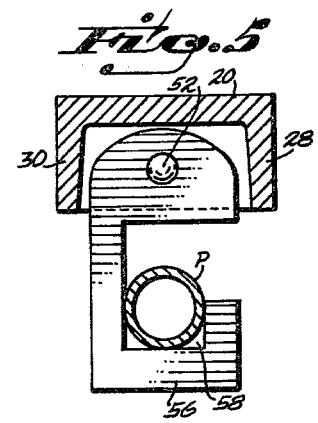
FIG. 5 is end cross section taken on the plane indicated by the line 5—5 of FIG. 2 and looking in the direction of the arrows.

Above the stem 18 of the valve V there is a threaded bolt 17 which is adjustable vertically by threaded advancement in the threaded bore 40 of the raised portion 34 of the skirted body 28. Thus, when the nut 17 is tightened, so that its lower end bears against the top of the stem 18, threaded movement lifts the body 28 and with it the hooked members 12 and 14 are drawn into hooked up relation with the pipe so that the portions 54 and 56 grip the underside of the pipe 58, as shown in FIG. 5. The hooks 12 and 14 are suspended on pins 50 and 52 which are parallel to the pipe and extend in confronting relation from the skirted body portions 24 and 26. It is noted that the portion 34 of the skirted body is raised slightly above the plane of the top of the skirted body to position the threaded bolt 17 above the stem and that, to this end, spacers 36 and 38 are provided about the valve stem hole 32.

Since the only way the valve may be opened is by turning the stem, it is seen that once in position, to open the valve, one must unloosen the screw so that the legs can be unhooked from the pipe. The legs may be disassembled from the pins by movement in the axial direction of the pipe. At any rate, after this is done, the body 28 can be removed from the valve so that the sides of the skirted body about the hole 32 do not block turning of the valve stem.

Figure 3:
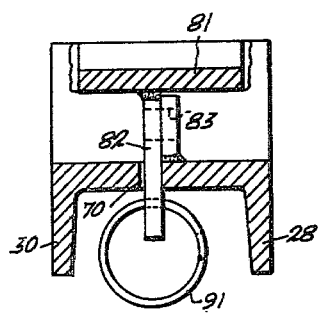
FIG. 3 is a partial view in cross section taken on the plane indicated by the line 3—3 of FIG. 2 and looking in the direction of the arrows.

So that the first step of opening the valve cannot be accomplished, the first step being the unscrewing of the screw 17, a cap is provided which blocks access to the screw. The cap is designated by the numeral 16. It includes an upper plate 86 and downwardly extending walls as at 88 and 90 encasing the screwhead 17 and these walls rest on the upper surface of the skirted body 20. Means are provided to connect the cap 16 to the skirted body 28 and to this end the plate 20 has two holes, such as 94, and from the cap, two downwardly extending outturned legs, such as 92, are provided, each of which legs hooks under the plate 20 when inserted through the holes, such as that designated by the numeral 94. An outwardly extending padlock or shield 81 is provided on the opposite side of the cap; and there extends downwardly a rigidly connected or welded vertical standard 82 which has a lower portion which extends through a hole 70 of the skirted body so that a foot is accessible within the skirted body. A ring type lock designated by the numeral 91 is adapted to be passed through the hole 95 to keep the cap locked in position, since the ring is not small enough to pass through the hole 70. Also, there is an upstanding portion 80 on the surface 20 with a hole as seen in FIG. 3 designated by the numeral 83 which extends through the two portions 80 and 82. It is thus seen that when a padlock is connected through the hole 83, a person seeking to cut the U-shaped portion 84 of the padlock will not be able to obtain easy access to it beneath the shield or ledge 81, which makes access to it quite difficult.

In use, a person seeking to open the valve, must know that he is required to follow certain steps in order to gain access to the valve stem to manipulate it. First, the padlock must be removed; thereafter, the lock ring 91 must be removed. Then, the cap 16 can be removed; and, following that, the screw must be unloosened so that there will be some loosening of the hooked connection to the pipe on opposite sides of the valve. After all of this is done, the hooks can be moved axially toward one another to slide them off of their support pins 50 and 52 for unhooking the device from the pipe. After all of this is done, and only after all of it is done, can the device be lifted from the position blocking manipulation of the valve for opening it.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent apparatus and articles.

What is claimed is:

1. For protectively housing a valve stem operator connected to a pipe, a device with a padlock comprising:

a skirted keeper body having a main aperature and including:
   (a) a pair of spaced hooked legs for hooked up engagement with the pipe, on either side of the valve stem in depending relation to the body,
   (b) an upstanding member having a first padlock aperture,
   (c) means connecting the legs to the body, and
   (d) axially adjustable singular lift means having a first end, the lift means aligned with the main aperture thereby when the skirted body is placed over the valve stem, the lift means first end bears against the valve stem and axially adjusting the lift means causes the body to be raised or lowered, in relation to the valve stem, and a cap including a first padlock end having a second padlock aperture aligned with the first padlock aperture when the cap is in overlaying relation to the body, and a second end, and said cap including means for removably connecting the cap to the body, thereby when the cap is in overlaying relation to the body main aperture, the valve stem is encased and the padlock holes aligned, and the padlock may be inserted through the first and second aligned padlock apertures for locked engagement of the cap and the body for protectively housing the valve stem and for preventing manipulation.

2. The device as set forth in claim 1 wherein the valve stem is elliptical and the main aperature is of a corresponding mating configuration being sized to prevent rotational movement of the valve stem, said main aperture being sized to receive the valve stem when the keeper body is in covering relation to the valve stem.

3. The device as set forth in claim 1 wherein the skirted keeper body includes a raised portion and a pair of spacers on either side of the raised portion, the raised portion having a threaded bore coincident and aligned with the main aperture and, wherein the lift means comprises a bolt having a first end bearing against the valve stem, the bolt threaded through the bore for axial movement thereby causing the keeper body to rise and fall depending on the axial rotation of the bolt.

4. The device as set forth in claim 1 or 3 wherein the means for removably connecting the hooked legs to the body comprise the body having leg support pins and each hooked leg having a first straight end, the end having a leg support hole for captivatingly and removably connecting the leg and body.

5. The device as set forth in claim 1 wherein the means for removably connecting the cap to the body comprises the body having two spaced holes and wherein the cap's second end includes a pair of spaced downwardly extending out-turned legs sized and spaced for compatible engagement with the holes.

6. The device as set forth in claim 1 or 5 wherein the first end of the cap comprises a shield member extending laterally from the cap, the shield member including a downwardly extending standard having the second padlock aperture, and wherein the upstanding member of the keeper body includes a standard hole which is aligned with the cap standard the standard hole being sized to receive the standard.

7. The device as set forth in claim 6 wherein a downwardly extending portion of the standard extends through said standard hole and includes a terminal end zone within said body and said terminal end zone includes a through hole and a ring lock is provided in said through hole, said ring lock being of a size sufficient so as to prohibit passage of the ring lock through the standard hole.

* * * * *